United States Patent
Bartell

(10) Patent No.: US 11,490,317 B2
(45) Date of Patent: Nov. 1, 2022

(54) SELECTIVELY SHEDDING PROCESSING LOADS ASSOCIATED WITH UPDATES TO A ROUTING TABLE IN A FIFTH GENERATION (5G) OR OTHER NEXT GENERATION NETWORK

(71) Applicant: AT&T Intellectual Property I, L.P., Atlanta, GA (US)

(72) Inventor: John Barry Bartell, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 46 days.

(21) Appl. No.: 16/793,508

(22) Filed: Feb. 18, 2020

(65) Prior Publication Data
US 2021/0258854 A1 Aug. 19, 2021

(51) Int. Cl.
*H04W 40/24* (2009.01)
*H04W 40/02* (2009.01)

(52) U.S. Cl.
CPC ......... *H04W 40/248* (2013.01); *H04W 40/02* (2013.01)

(58) Field of Classification Search
None
See application file for complete search history.

(56) References Cited

U.S. PATENT DOCUMENTS

| | | | | |
|---|---|---|---|---|
| 6,535,498 B1* | 3/2003 | Larsson | ................ | H04L 45/122 370/254 |
| 6,654,359 B1* | 11/2003 | La Porta | ........... | H04L 29/12216 370/328 |
| 6,760,314 B1* | 7/2004 | Iwata | ...................... | H04L 43/00 370/238 |
| 2003/0123457 A1* | 7/2003 | Koppol | ................. | H04L 45/502 370/400 |
| 2004/0114569 A1* | 6/2004 | Naden | ..................... | H04L 45/08 370/351 |
| 2004/0233882 A1* | 11/2004 | Park | ........................ | H04L 45/16 370/338 |

(Continued)

OTHER PUBLICATIONS

Bartell "Selectively Sending Routing Information to Routing Devices in a Fifth Generation (5G) or Other Next Generation Network" U.S. Appl. No. 16/804,429, filed Feb. 28, 2020, 43 pages.

(Continued)

*Primary Examiner* — Brian S Roberts
(74) *Attorney, Agent, or Firm* — Amin, Turocy & Watson, LLP

(57) ABSTRACT

The technologies described herein are generally directed toward shedding processing loads associated with route updates. According to an embodiment, a system can comprise a processor and a memory that can enable operations facilitating performance of operations including facilitating receiving, from a second routing device, a route update for a routing table of the first routing device, wherein the route update is associated with a route. The operations can further comprise evaluating a value of the route update, resulting in an evaluated value of the route update. The operations can further comprise updating an entry of the routing table based on the route update and the evaluated value of the route update.

20 Claims, 9 Drawing Sheets

(56) References Cited

U.S. PATENT DOCUMENTS

| | | | | |
|---|---|---|---|---|
| 2007/0014276 | A1* | 1/2007 | Bettink | H04L 45/38 |
| | | | | 370/351 |
| 2009/0180448 | A1* | 7/2009 | Kobayashi | H04W 40/08 |
| | | | | 370/338 |
| 2017/0289013 | A1* | 10/2017 | Haas | H04L 45/021 |
| 2018/0092020 | A1* | 3/2018 | Torres | H04W 40/248 |
| 2021/0029020 | A1* | 1/2021 | Chen | H04L 45/02 |

OTHER PUBLICATIONS

Bartell, "Selectively Rerouting Network Traffic in a Fifth Generation (5G) or Other Next Generation Network", U.S. Appl. No. 16/793,283, filed Feb. 18, 2020, 48 pages.

Bartell, et al. "Selectively Bypassing a Routing Queue in a Routing Device in a Fifth Generation (5G) or Other Next Generation Network", U.S. Appl. No. 16/794,534, filed Feb. 19, 2020, 46 pages.

Bartell, "Selectively Using a Co-Processor to Process Network Routing Information in a Fifth Generation (5G) or Other Next Generation Network", U.S. Appl. No. 16/804,521, filed Feb. 28, 2020, 54 pages.

Bartell, et al. "Establishing Domains of Authority for Routing Table Updates Between Routing Devices in a Fifth Generation (5G) or Other Next Generation Network", U.S. Appl. No. 16/804,568, filed Feb. 28, 2020, 55 pages.

* cited by examiner

SELECTIVELY SHEDDING PROCESSING LOADS ASSOCIATED WITH UPDATES TO A ROUTING TABLE IN A FIFTH GENERATION (5G) OR OTHER NEXT GENERATION NETWORK

TECHNICAL FIELD

The subject application is related to computer networking, and, for example, using a router to select network traffic routes in a fifth generation (5G) or other next generation network.

BACKGROUND

As networks continue to be expanded to handle larger amounts of information, the need for rapid and efficient routing within networks continues to increase. This is especially true when existing networks are used to carry larger traffic before hardware capabilities have been increased.

With traditional routing strategies, routing devices can receive routing information from other different routing devices, with continual hardware upgrades matching increases in network use. With recent dramatic increases in demand for network bandwidth however, in some circumstances, even traditional hardware upgrades can be rendered ineffective. For example, in some circumstances, sharing route update information among routing devices can exceed the capacity of network links, as well as the processing resources of both the router providing, and the router receiving, the route update information.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
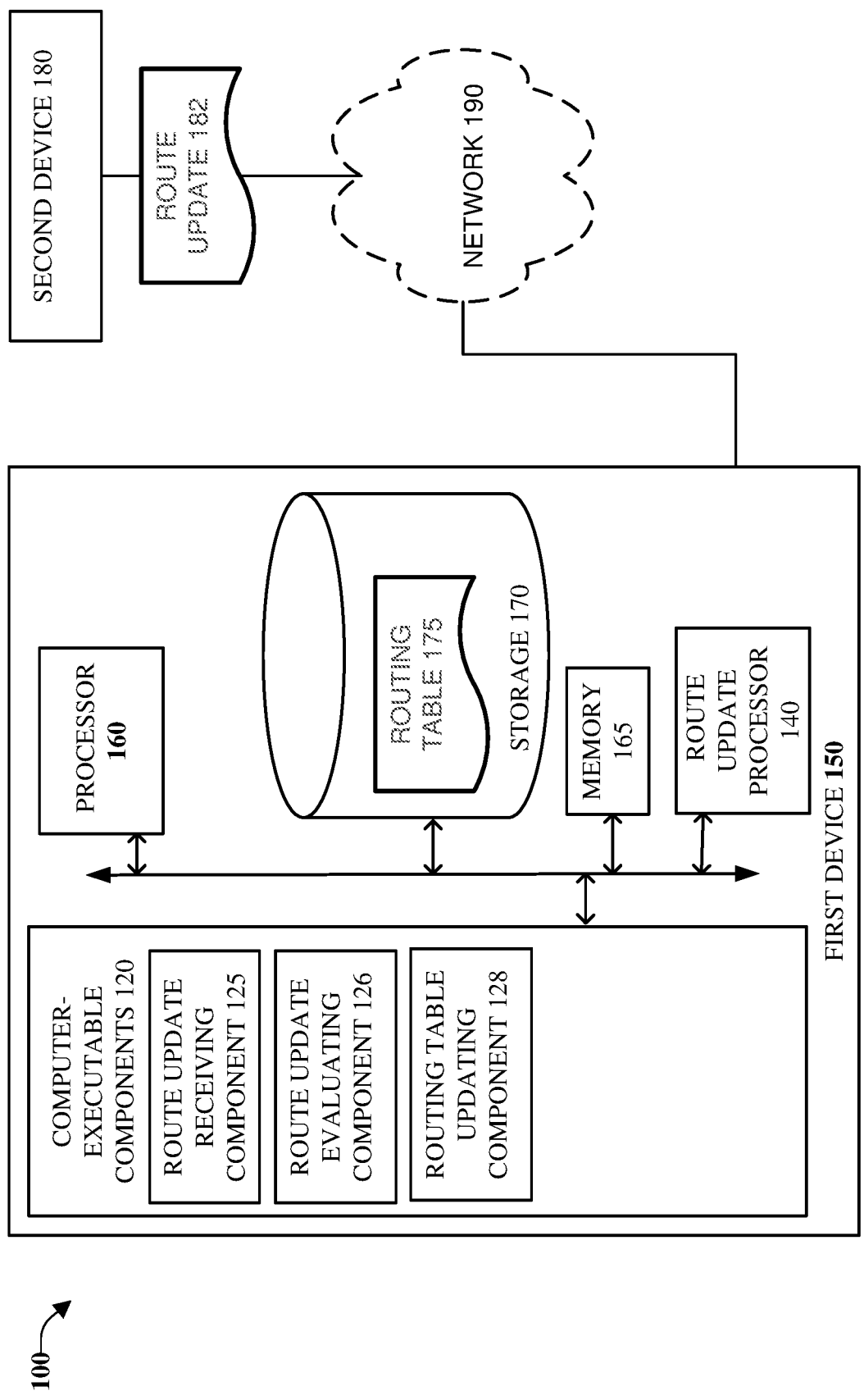
FIG. 1 is an architecture diagram of an example system that can facilitate shedding processing loads associated with route updates, in accordance with one or more embodiments.

Generally speaking, one or more embodiments can provide improved routing among multiple routing devices, in fifth generation (5G) or other next generation networks. In addition, one or more embodiments described herein can be directed towards a multi-connectivity framework that supports the operation of New Radio (NR, sometimes referred to as fifth generation (5G)) As will be understood, one or more embodiments can allow an integration of user equipments (UEs) with network assistance, by supporting control and mobility functionality on cellular links (e.g. LTE or NR). One or more embodiments can provide benefits including, system robustness, reduced overhead, and global resource management, while facilitating direct communication links via a NR sidelink.

In some embodiments, the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc. As noted above, some embodiments are described in particular for 5G new radio systems. The embodiments are however applicable to any radio access technology (RAT) or multi-RAT system where the user equipment operates using control signals, e.g. LTE FDD/TDD, WCMDA/HSPA, GSM/GERAN, Wi Fi, WLAN, WiMax, CDMA2000, etc.

In some embodiments, the non-limiting term router, routing device, or router device is used. This term can refer to any type of electronic device that can facilitate the connection of one or more nodes to a network, and between two or more nodes in the network. It should further be noted that, one or more embodiments used in examples herein utilize routers that employ an approach to network connectivity that is based on minimizing delay by employing large numbers of route updates throughout the network, e g, minimizing delay in a network route by making available frequently updated information about the network routes (e.g., route information discussed below) for use in planning network routes, e.g., link transmission speed, and queue delays.

One approach to implementing embodiments of this delay-minimizing approach to routing is to have routers frequently generate route updates for other routers, with routers receiving updates, rapidly processing the route updates, and using the processed route updates to direct network traffic to routes that can reduce delays. One aspect of this approach to routing is that it can utilize a router to process up to millions of route updates per second, and this level of route processing can be improved by one or more of the embodiments described herein. It should be noted that, as discussed further below, in one or more non-limiting embodiments, route update can be rapidly and extensively propagated from router to router, with the overhead of such an approach being considered along with increases in routing success that can be achieved by the approach. Further, notwithstanding the relationship between embodiments of this network routing approach and embodiments of handling route updates by routers described herein, the combinations of features described in one or more embodiments, and recited in the claims below, can be applied to other approaches to network routing beyond approaches described in one or more of the examples used herein.

In example approaches to routing that can beneficially employ one or more embodiments, routing devices can perform a variety of operations on route updates, including, but not limited to, receiving updates, rapidly processing route updates, using processed route updates to direct network traffic to routes that can reduce delays, and determining whether to forward route updates to other routing devices. As discussed further herein, in some circumstances, one or more embodiments can facilitate a reduction in routing overhead by selectively shedding processing loads associated with updates to a routing table FIG. 1 is an architecture diagram of an example system 100 that can facilitate shedding processing loads associated with route updates, in accordance with one or more embodiments. For purposes of brevity, description of some elements and/or processes of embodiments discussed further below are omitted in this discussion of FIG. 1. System 100 can include first device 150 connected via network 190 to second device 180. First device 150 can include computer-executable components 120, processor 160, route update processor 140, storage 170, and memory 165. Computer-executable components 120 can include route update receiving component 125, route update evaluating component 126, routing table updating component 128, and other computer-executable components 120 that can be used to implement aspects of system 100, as described herein.

In some embodiments, memory 165 can comprise volatile memory (e.g., random access memory (RAM), static RAM (SRAM), dynamic RAM (DRAM), etc.) that can employ one or more memory architectures. Further examples of memory 165 are described below with reference to system memory 1004 of FIG. 10 discussed below. In some embodiments, storage 170 can comprise non-volatile memory (e.g., read only memory (ROM), programmable ROM (PROM), electrically programmable ROM (EPROM), electrically erasable programmable ROM (EEPROM), etc.) that can employ one or more storage architectures. Such examples of memory 165 and storage 170 can be employed to implement any embodiments of the subject disclosure described or suggested by disclosures herein.

According to multiple embodiments, processor 160 can comprise one or more processors and/or electronic circuitry that can implement one or more computer and/or machine readable, writable, and/or executable components and/or instructions that can be stored using memory 165 and storage 170. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processor 902 of FIG. 9 below, and processing unit 1004 of FIG. 10 discussed below. Such examples of processor 160 can be employed to implement any embodiments of the subject disclosure.

It should be noted that, in the example of FIG. 1, and throughout this disclosure, route update processor 140 is listed separately from processor 160, and this is because route updates 182 (as well as other routing information, such as routing table 175) can, in one or more embodiments, be generated, processed, and modified by different types of processors, e.g., specialized route updating processors. Different reasons why this is done by some implementations are discussed further below with FIGS. 3-5, e.g., because of the volume of route updates 182 that can be generated, processed and used by one or more embodiments to rapidly select network routes and change network routing. In this example, the route update processor 140 can generate the routing information (e.g., with extensive processing), while the processor 160 can use much less processing power to utilize the generated information, e.g., routing table 175 and route updates 182. As further discussed below, route update evaluating component 126 can provide a pre-processing assessment of route updates that can reduce the amount of processing that is performed by route update processor 140.

According to multiple embodiments, first device 150 can include memory 165 that can store one or more computer and/or machine readable, writable, and/or executable components and/or instructions 120 that, when respectively executed by processor 160, can facilitate performance of operations defined by the executable component(s) and/or instruction(s). For example, memory 165 and storage 170 can store computer and/or machine readable, writable, and/or executable components 120 and/or instructions that, when executed by processor 160, can facilitate execution of the various functions described herein relating to first routing device 150. As depicted, first device 150 includes computer-executable components 120 that can comprise route update receiving component 125, route update evaluating component 126, routing table updating component 128, and other computer-executable components 120 that can be used to implement aspects of system 100, as described herein. Each of these components are described in detail, with one or more embodiments described below.

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices It should be appreciated that the embodiments of the subject disclosure depicted in various figures disclosed herein are for illustration only, and as such, the architecture of such embodiments are not limited to the systems, devices, and/or components depicted therein. For example, in some embodiments, first device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

As described further below, in one or more embodiments, memory 165 can store executable instructions that, when executed by the processor can facilitate performance of operations that can implement one or more embodiments described herein. For example, in one or more embodiments, the operations can implement route update receiving component 125 that can facilitate receiving a route update for routing table 175 of first device 150 communicated via network 190 by second device 180, wherein the route update is associated with a route. Examples of routes and route updates are included with the discussion of FIG. 2 below. In an alternative embodiment, the operations can implement route update identifying component 125 that can facilitate identifying a route update 290 by detecting, by the first routing device, route information corresponding to route update 290.

In one or more embodiments, memory 165 can further store executable instructions that, when executed by the processor can facilitate performance of operations that can implement route update evaluating component 126. In one or more embodiments, route update evaluating component 126 can evaluate a value of the route update, resulting in an evaluated value of the route update. Generally speaking, in one or more embodiments, the value of a route update can describe the usefulness of the route update for efficiently routing network traffic In one or more embodiments memory 165 can further store executable instructions that, when executed by the processor can facilitate performance of operations that can implement route routing table updating component 128. In one or more embodiments, routing table updating component 128 can update an entry of the routing table based on the route update and the evaluated value of the route update.

Figure 2:
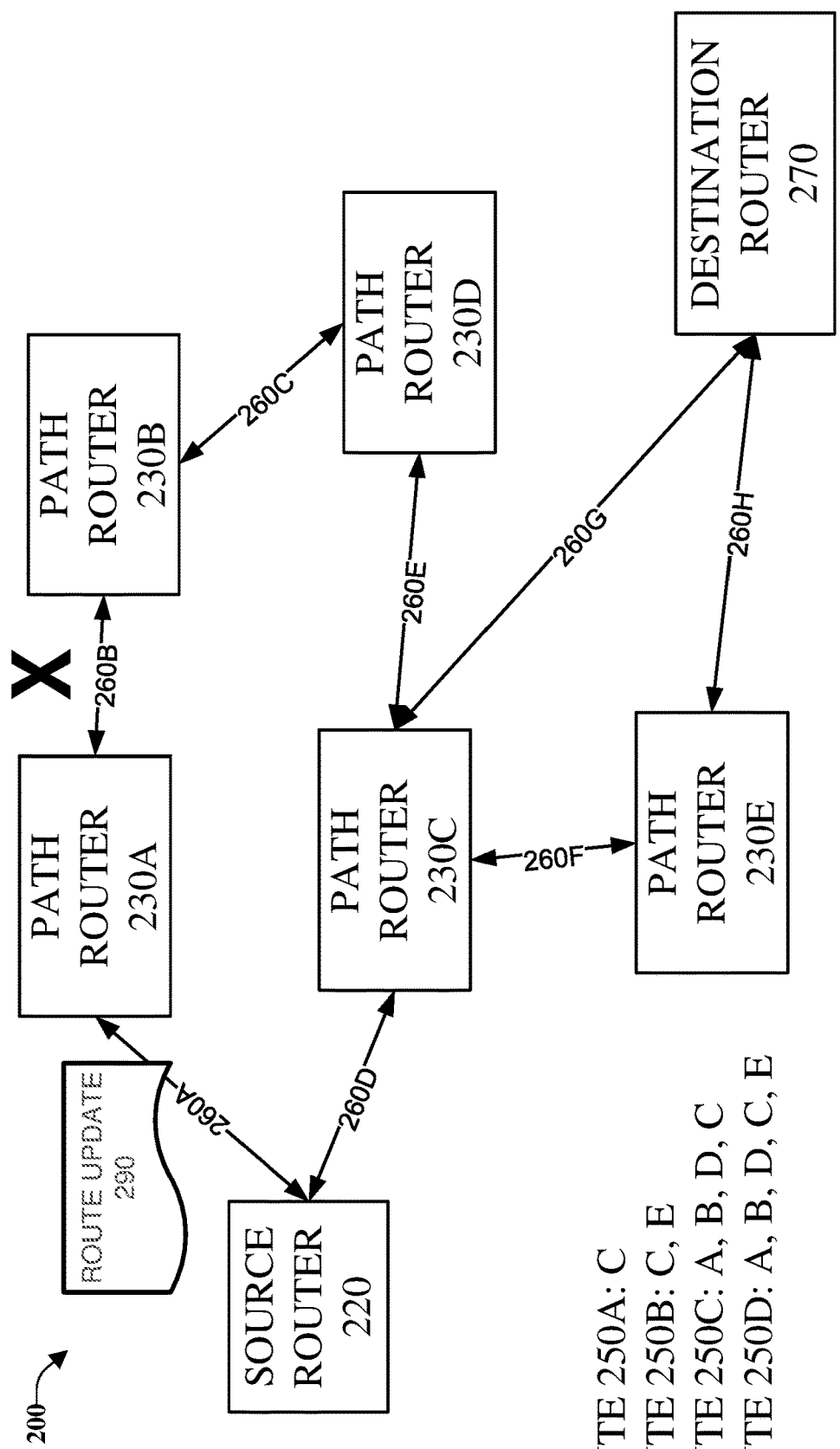
FIG. 2 illustrates an example node diagram of a network, in accordance with one or more embodiments.

FIG. 2 illustrates an example node diagram of a network with components that can implement a system for selectively sending routing information to routing devices, in accordance with one or more embodiments. For purposes of brevity, description of like elements and/or processes employed in other embodiments is omitted. Network 200 includes source router 220, destination router 270, routers 230A-230E, and links 260A-H between variously depicted nodes. One having skill in the relevant art(s), given the description herein will appreciate that FIG. 2 depicts elements of network routing example. In this example, packets traveling from source router 220 to destination router 270 pass through ones of routers 230A-230E along a route. Example routes 250A-250D are listed on FIG. 2, and include example routes from source router 220 to destination router 270. A route update 290 is depicted being forwarded from router 230A. One having skill in the relevant art(s), given the description herein will appreciate that FIG. 2 depicts elements that can be used to illustrate different approaches to routing traffic in network 200.

In one or more embodiments, routers as depicted (e.g., 220, 230A-E, and 270) can receive and send packets of information to connected routers in accordance with a selected path towards a destination router 270, e.g., TCP/IP routing. One having skill in the relevant art(s), given the description herein, would appreciate that one approach that can be used by routers to improve the selection, for packet relay, from available routers is the use of a routing table 175, local to each router 230A-E. This routing table 175 can collect known information about network links along different paths, and facilitate the selection of the next router. For example, if source router 220 has information in a routing table 175 that corresponds to a problem with link 260B, an algorithm that selects from routers 230A and 230C can select router 230C because this problem is avoided.

In one or more embodiments, different ways can be used to populate respective routing tables 175 of routers with information about network links. One way to determine this information is by pinging adjacent nodes to test the round trip speed of a data packet. This information when gathered can be compared to information already stored in the routing table 175 of the pinging router, and if the information is determined to be useful, it can be stored in the routing table for use by the pinging node.

In an example, source router 220 can ping both routers 230A and 230C, and store the results of these pings in a routing table 175 for use routing received packets, e.g., as a determined delay between source router 220 and each of routers 220A and 220C. This approach however does not, in some implementations, provide information about other relevant, though non-adjacent links, e.g., it cannot provide source router 220 with information about the problems of non-adjacent link 260B discussed in the previous example. One solution to this distribution of information to routers of network 200 is to facilitate both the collection of information by individual nodes (e.g., by pinging adjacent nodes), and the distribution of that information to adjacent nodes. In this example, router 230A can ping router 230B and identify the speed of link 260B. While this information can be stored in the routing table 175 of router 230A, it can also be relayed to source router 220 in a route update information message, termed for convenience herein a route update 290. Upon receipt of the route update 290, source router 220 can determine that this information should be stored in its local routing table 175 for use, e.g., by evaluating the value of the information (e.g., with lower delays evaluated as having higher value), discounted by the age of the information (e.g., by the TTL value of the route update, as discussed herein). If determined as valuable and stored in routing table 175, in one or more embodiments, the information about link 260B, can be stored with a derived (e.g., from other known link information, such as link 260A) in routing table 175 as a delay between source router 220 and router 230B. One having skill in the relevant art(s) will appreciate that other information can be stored in routing table 175 without departing from the spirit of embodiments described herein.

Given the disclosure herein, one having skill in the relevant art(s) will appreciate that a variety of different types of information can be included in route update 290 information received by routers 220, 230A-E, and 270 from other routers of network 200. Route updates 290 can also arrive at routers at different intervals and with different levels of accuracy, e.g., the information about links 260A-H can arrive a relatively short time after discovery or a longer time, with older information being less likely to be accurate. As described further below, different embodiments described herein have different approaches to implementing different features of embodiments, such as route update 290 intervals, the content of route updates 290, evaluating the value of route updates 290, and the distance that route updates 290 travel within network 200 before the relay of this information is stopped, for different reasons.

One having skill in the relevant art(s), given the disclosure herein will appreciate that because, in one or more embodiments, route updates can be flooded through the network, it can provide performance improvements to the system to selectively shed processing loads (e.g., received route updates 290) associated with updated to routing updates.

One or more embodiments can, to reduce overhead on links (e.g., links 260A-H) and on route update processor 140, instead of forwarding identified route updates to connected nodes without evaluation (e.g., from router 230A to 230B via link 260B), one or more embodiments can selectively forward route updates based on different criteria. For example, criteria can be applied that can send route updates 182A-B when there is a prediction that the update will be valuable to the destination node. Different examples are provided below to illustrate different circumstances where route updated 182A-B are selectively not forwarded based on a prediction that the route updates 182A-B will not be useful to the proposed destination node. In one or more embodiments, route updates 182A-B that are forwarded, continue to be forwarded and evaluated, and until the time to live (TTL) of the information is exceeded, e.g., a particular amount of time elapses since the route update was generated, or the route updates a forwarded a certain number of times, with each forward to a new routing device also being termed a hop. This follows a general principle of one or more embodiments, this being that the usefulness of information can be discounted by the age of the information, this discount being for reasons including, but not limited to, the older the information is, the higher the likelihood it is no longer accurate to some degree.

In one or more embodiments, an estimate of a value of a route update 182A-B can be termed the authority of the route update. One approach to determining the authority of a route update can estimate the value of the information toward selecting a particular routing strategy. A more detailed discussion of authority is included below with the discussion of FIG. 6.

In an example that can be illustrated with network 200 of FIG. 2, route information can be identified by source router 220 that can provide routing information about a route between source router 220 and destination router 270. In FIG. 2, three routes are identified, two of which utilize link 260E, between path router 230D and destination router 270. In this example, the routing information is that link 260E is temporarily unavailable for use. This information can be identified by source router 220 in a variety of ways, including, but not limited to, receiving it from another node (e.g., path router 230D can discover this information about an immediate link 260E) and relay this route update 290 via router 230A-E to source router 220. In another example, destination router 270 can detect the malfunctioning link 260E and send route update 290 to path router 230E, where this route update can be further forwarded to path router 230C and source router 220. Other ways this information can be identified by source router 220 include detection of this unavailable link 260E, by source router 220, during a periodic ping of the route to destination router 270, this process of pinging being discussed further with FIG. 4 below.

One having skill in the relevant art(s), given the description herein, would appreciate other ways that the network information about link 260E can be identified by source router 220. It should be appreciated that route information that can be used by one or more embodiments is not limited to this example, and can be any information relevant to network 200 routing, at current time and in the future. It should be further noted that, as discussed above, in one or more embodiments, the information of the route update regarding link 260E is discounted in value as it ages, e.g., as it traverses to path router 230E and path router 230C.

Expanding on this description, FIG. 3 below, describes different approaches that can be used by one or more embodiments to perform routing operations for a network of nodes.

Figure 3:
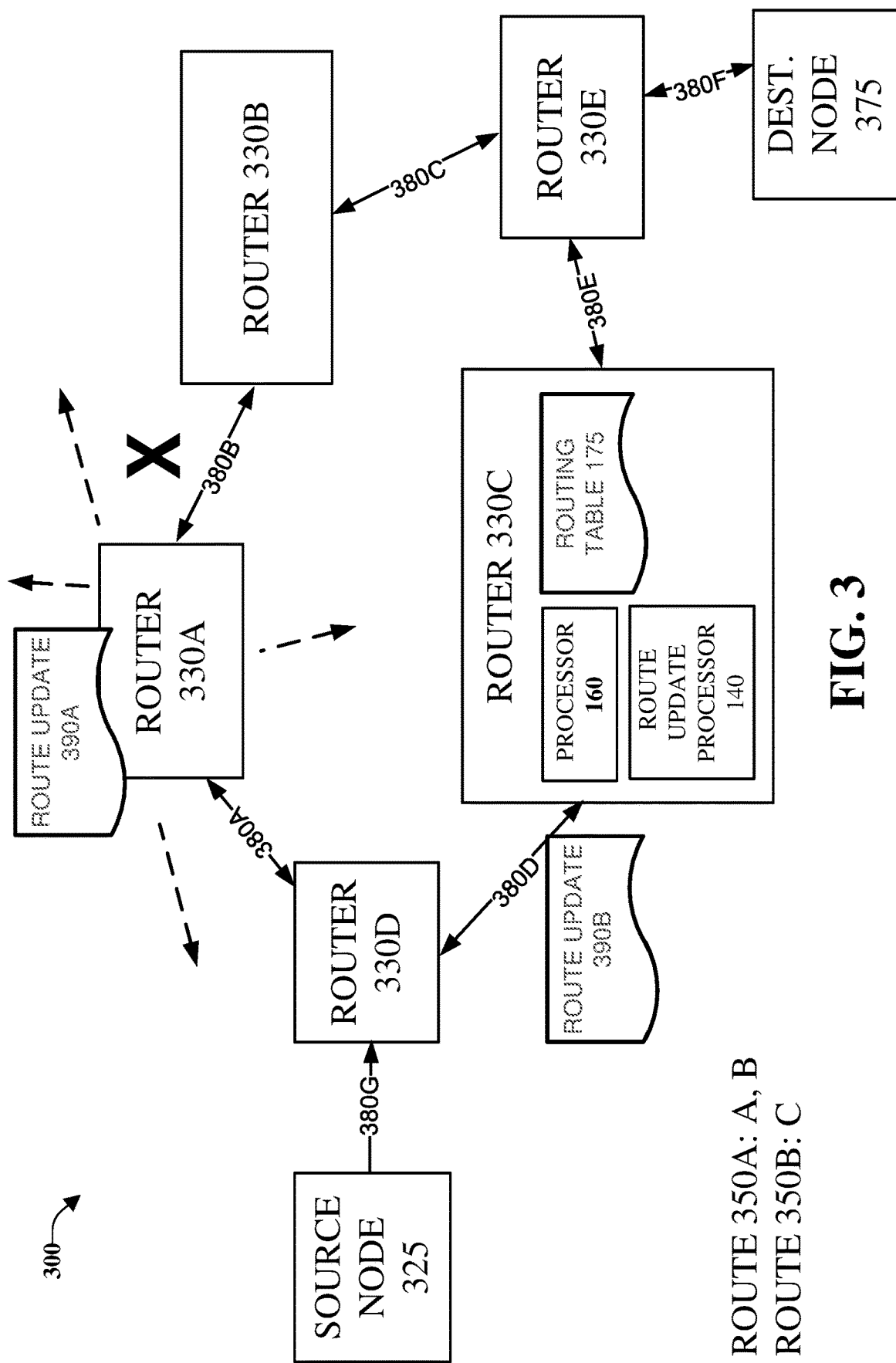
FIG. 3 illustrates another example node diagram of a network, in accordance with one or more embodiments.

FIG. 3 illustrates another example node diagram of a network 300, in accordance with one or more embodiments. For purposes of brevity, description of like elements and/or processes employed in other embodiments is omitted. Network 300 includes source router 330D, destination router 330E, routers 330A-330E, links 380A-G from source router 330D to destination router 330E, and inbound links 385A-E from destination router 330E to source router 330D. FIG. 3 can be used to illustrate different approaches that can be used by source router 330D to maintain routing table 175 and select between route 350A, from source router 330D to routers 330A-B, then to destination router 330E, and route 350B, from source router 330D to router 330C, then to destination router 330E, with destination router 330E being communicatively coupled to destination node 375.

As discussed above with network 200, in one or more embodiments, routers 330A-E can determine information about network route information, update a routing table, and share these updates with other nodes. It should be noted that, in example implementations, routing tables can be updated up to 500,000 times per second with current delay information determined from testing and from nearby nodes. As noted below, with some exceptions, any change in routing information identified by routers 330A-E are immediately propagated (e.g., using a flooding control protocol) to adjacent nodes, these nodes in some cases discussed below, further flooding the updated information to adjacent nodes.

In an example depicted in FIG. 3, router 330D, coupled to source node 325, can maintain routing table 175 based on information received by route update receiving component 125, from adjacent routers 330A and 330C about the operation of network 300. One having skill in the relevant art(s), given the description herein will appreciate other measures of network 300 operation, beyond the ones of this example, that can affect the maintenance of routing table 175.

As discussed further below, when considering the processing performed by route update processor 140 by one or more embodiments, it should be noted that, like the rapid and extensive propagation of route update 390A by router 330A, generally speaking, upon receipt and after processing, source router 330D can be configured to send out route update 390A to all adjacent routers, e.g., router 330C.

In one or more embodiments, because of the extensive generation and propagation of route updates 390A by routers 330A-E, the frequency of route updates 390A-B received by routers 330A-E can cause route update processing loads that exceed the capacity of available processing resources. With respect to the example routing tables being updated up to 500,000 times per second with current delay information noted above, by some estimations, processing capability of over a $100 \times 10^{12}$ floating point operations per second (100 teraFLOPS) can be required, potentially exceeding the processing capacity of a Central Processing Unit (CPU). As noted above, one approach that can be employed by one or more embodiments is to have specialized processing resources dedicated to processing route updates 390A, e.g., one or more route updating processors 140.

In one or more embodiments, additional approaches can be employed that can reduce the likelihood that the processing capacity of one or more route updating processors 140 will be exceeded by the processing of received route updates 390A. In an example system with frequent route updates being exchanged between routers, as well as frequent updates to routing tables 175, even with one or more dedicated and specialized route update processors 140, the route processing capacity of individual routers 330A-E can be insufficient to process and utilize the routing information available for use. In a further illustration of the route information processed by one or more embodiments, different processing tasks that can be performed by one or more embodiments are discussed further with FIG. 4 below. As discussed further below, one or more embodiments can reduce the route update processing load of routers 330A-E without reducing the quality of route data available for use for routing in routing table 175.

For example, to reduce the likelihood that the processing capacity of one or more route updating processors 140 will be exceeded by the processing of received route updates 390A-B, one or more embodiments can employ features designed to reduce the number of route updates that are propagated from a router once received by the router. Thus, in some circumstances, route updates 390A-B are propagated to all adjacent nodes without analysis and with little restriction, and in other circumstances, this propagation is cut off, e.g., after the route update is too old to likely be useful.

One approach is to limit routing information propagated to adjacent routers based on different criteria. For example, network information identified by a router 330A-E can cause the generation and propagation of a route update 390A-B when a predicted utility of the routing information exceeds a threshold, e.g., a queuing delay at a node exceeds a value, or a the bits per second of a network link 380A-G falls below a particular value. Other non-limiting, example approaches for predicting utility are discussed below, and with the discussion of FIG. 5.

As discussed further below, another way that the processing loads can be reduced for receiving routers 330A-E, is for the receiving nodes to perform as assessment of the route update upon receipt, before a more sophisticated level of processing is performed by route update processor 140. In one or more embodiments, this assessment can be a rapid operation that can determine the quality of the route update information, e.g., the comparison of a one or more metrics that can indicate quality to a threshold.

In one or more embodiments, the countdown of the TTL value for route update 390A can be commenced and decremented is different ways. Returning to the example above, upon identification of the routing information, router 330A can note a time. When generating route update 390A, in this example, to further remove processing tasks from router 330D, router 330A can precalculate what the TTL will be at the time of receipt by router 330D. In one or more embodiments, this can be performed based on a measurement by router 330A of values that include, but are not limited to, the control transmission queue delay for router 330A (e.g., the route update may have to wait for transmission) and the transmission time across link 380A, e.g., this value being collected (e.g., via a ping of router 330D) and stored for use in routing table 175. One having skill in the relevant art(s), given the description herein, will appreciate that other approaches can be used to manage the TTL of route updates 390A-B, in accordance with one or more embodiments.

Considering one effect of TTL in the operation of embodiments, in some circumstances, assessed route information quality can incorporate a discount in the quality of the information based on the age of the information, e.g., as time passes after the identification of routing information, the accuracy of the identified information can decline as a description of particular network conditions at a particular link. In one or more embodiments, older information can still provide useful information, but the use of the information takes potential inaccuracies into account in different ways. As discussed further below, one approach to this, used by this example, assigns a time to live (TTL) value to route update information, e.g., the route update is only propagated to adjacent routers for a particular duration. By stopping propagation of route update 330A-B, the further spread of this information can be limited. Assigning this value also, in one or more embodiments, can have the effect of limiting the influence of a router in both time and space. For this example, a 250 μsec TTL is used, but one having skill in the relevant art(s), given the description herein, would appreciate that other TTL durations can be selected, with different results.

Further, in one or more embodiments, the authority of individual routers 330A-E can be limited in time because of the TTL applied to route information identified by respective routers, and limited in space based on physical limits, e.g., the speed of light can limit the propagation of any information to approximately 46 miles per 250 μsec TTL, and the propagation medium can slow this down further. For example, in some implementations, the maximum propagation speed for a route update is ⅔ the speed of light, e.g., approximately 31 miles in fiber-optic cable. Thus, in this example, with links 380D and 380E being implemented with fiber-optic cable, a route update 390B generated by router 330D would not reach router 330E if the distance of link 380D exceeds 31 miles, e.g., by the time route update 390B reaches router 330C, the 250 μsec TTL for route update 390B has expired, and, while route update 390B can be utilized by router 330C, router 330C does not propagate route update 390B to router 330E.

As noted above, in one or more embodiments, TTL can be used to limit the propagation of route updates 390A-B, e.g., based on a geographical distance limit that comes from signal propagation. Further, as noted above, one or more embodiments can perform a quick assessment, e.g., comparing values of a route update to a threshold. In an example embodiments, these two concepts can be combined such that the only value considered with respect to the quality of the route update is the age of the update, e.g., as determined by the TTL at the time of receipt.

Additional examples of one or more embodiments limiting propagation of route updates are discussed below. Returning to the example discussed above, where router 330D receives route update 390A (e.g., with a round trip time of link 380B, determined by a ping of router 330B) from router 330A, upon receipt of route update 390A by router 330D, router 330D can either immediately forward the route update to all adjacent routers (e.g., including back to router 330A), or one or more embodiments can determine whether route update 390A satisfies one or more criteria for different potential destination routers, e.g., router 330A, and router 330C. It should be noted that one condition that can be applied to forwarding route updates is a TTL greater than zero, e.g., during the TTL of a route update, it is more likely to be an accurate representation of network conditions. Additional criteria, such as predicted utility, as well as determining an authority for route information, are discussed below with FIG. 5.

In addition to determining whether to propagate a route update, and whether to process route updates 390A-B, TTL can also be used to determine whether new information received from the route updates 390A-B should evict the information about the same network element from routing table 175. For example, as described in the example above, route update 390A can be generated based on a ping of router 330B by router 330A that measures the transmission speed of link 380B.

In one or more embodiments, results of a ping can determine one element of the potential delay of a path. As described throughout this disclosure, the delay of a path (also termed "path delay") can used for routing determinations made by a router. Further, routers can exchange path delays for routes for which information is available to the router, and this communication can facilitate data about links (e.g., route information) of network 300 being available to other routers in network 300. In one or more embodiments, when a router sends route information to another router, the sending router can add the delay of the link used for the sending, and thus can provide updated route information for entry into routing table 175.

In this example, route update 390A includes this measurement, and is received by router 330D. Upon receipt, in one or more implementations, the TTL of route update 390A can be identified. For example, route update evaluating component 126 determines a TTL of 250 μsec (e.g., starting TTL of 250 μsec TTL reduced by a 50 μsec transmission time for link 380A). In this example, because route update 390A arrives at router 330D with a positive TTL, this update is accepted for processing by route update processor 140. In one or more embodiments, TTL can be precalculated by the transmitting router because, in some embodiments, the transmitter router may be the only source of the example four elements of delay of the link for which route update 390A is distributed.

Continuing this example, during processing by route update processor 140, a prior value is identified that describes the transmission speed of link 380B. In one or more embodiments, route update processing can then proceed to compare the quality of the new route information in route update 390A and the currently stored information. This quality can be measured in different ways, with one approach being based on the content of the update (e.g., a delay based on transmission speed of link 380B) discounted by the age of the information, e.g., based on the amount the TTL has been reduced from the starting value (e.g., a TTL of 250 μsec). This approach used by one or more embodiments can be based in part on a concept that a lower delay value for link 380D is of higher quality than a higher delay value for link 380D, without considering the age of the delay values. To incorporate the age of the delay value with this quality, one or more embodiments can use different mathematical formulas to discount the quality value by also considering the remaining TTL of the route update.

Thus, based on the forgoing embodiments, in some examples, if an entry in routing table 175 has a delay for link 380B as 20 μsec, but the information is 300 μsec old, and a route update 390B is received that measures the link delay at 10 μsec with a TTL of 200 μsec, then the older, stored value of 20 μsec can be replaced by the new route update 390A supplied value of 10 μsec. In other examples, route information stored in routing table 175 can have been determined more recently than the information in route update 390B, and this, combined with the delay information, can lead to the opposite result, e.g., the information of route update 390B being unused for the updating of routing table 175. It is worth noting however that, in some circumstances, because of the rapid forwarding of route update 390B, and the example TTL of 200 μsec being above zero, route update 390B can be forwarded to router 330C, even though it is not used by router 330D. One having skill in the relevant art(s), given the description herein, would appreciate that this approaches, along with the approaches used by many other example features described herein, can combine a goal of rapid propagation of network updates (e.g., leading to more accurate routing) with a potential for inaccurate results, e.g., based on accurate updates being unused based on the age of the information. Different parameters have been described herein that would enable the implementation and tuning of one or more embodiments to achieve the results desired.

Figure 4:
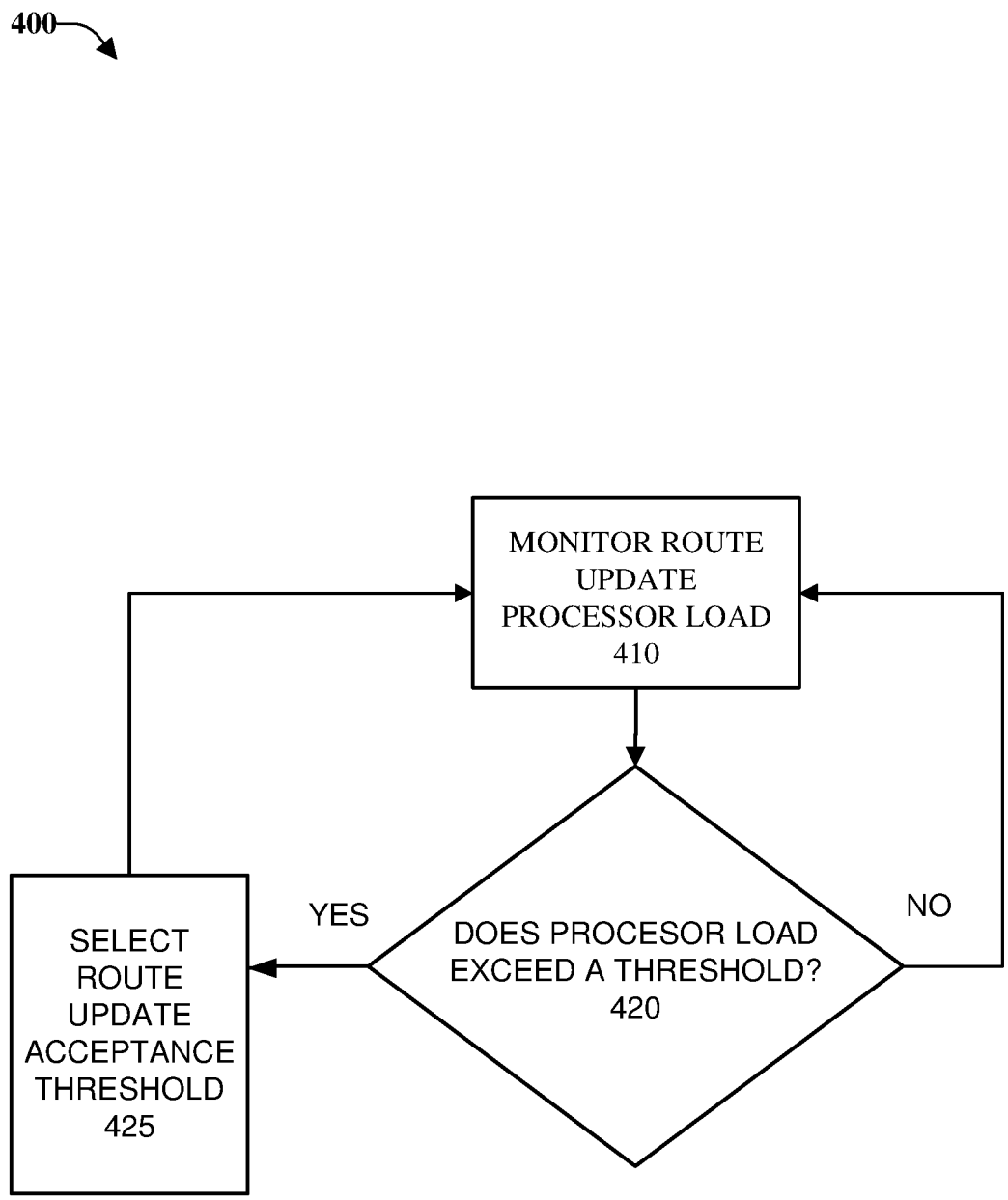
FIGS. 4 and 5 describe processes for gathering, by a routing device, information about different routing characteristics of network links and path routers that can facilitate the routing of packets to a destination router, in accordance with one or more embodiments.
Figure 5:
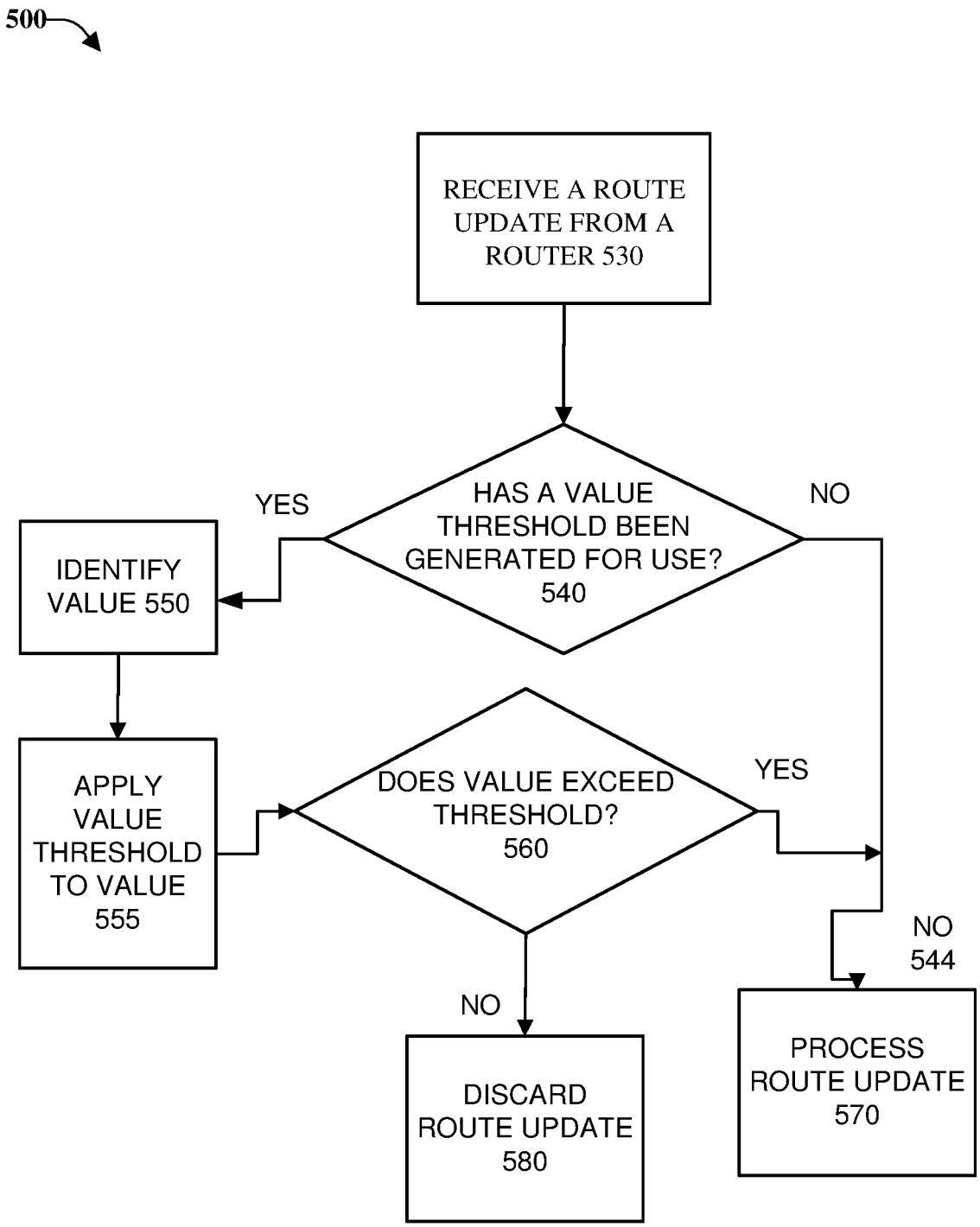

FIGS. 4-5 depict flow diagrams of an example approach to limiting the amount of route updates 390A-B that are processed by route update processor 140, in accordance with one or more embodiments. As noted above, in one or more embodiments, route update receiving component 125 can, in some implementations, receive hundreds of thousands of route updates 390A-B per second. As described below, FIG. 4 describes the monitoring of a route update processing load of route update processor 140, and the generation of a threshold for acceptance of route updates 390A-B for processing, e.g., to reduce the route processing load. FIG. 5 describes the potential use of this generated threshold during the processing of received route updates 390A-B.

Thus, based at least part of the foregoing disclosure, one having skill in the relevant art(s), given the disclosure herein, will appreciate that one or more embodiments can be configured to generate frequent route updates for network conditions, with a discounting the value of routing information in some circumstances, e.g., over time. Further, based on the frequency of route updates generated by nodes, in different implementations, the number of route updates evaluated per second can range into the hundreds of thousands, with smaller and larger implementations being available. FIGS. 4-5 below provide descriptions of embodiments and examples, that can use elements of embodiments discussed above (e.g., determined information quality and update processing), to alter how route updates can be processed by route update processor 140.

Generally speaking, FIG. 4 depicts a process whereby the above described limits on route update 390A being processed by receiving source router 330D can be modified based on the processing load of the route update processing resources of router 330D, e.g., whether or not to implement these limits, and if so, what threshold is selected, can be determined and dynamically set by the monitored processing load of router 330D.

At 410 of FIG. 4, one or more embodiments can monitor the processing load of route update processor. One having skill in the relevant art(s), given the description herein, will appreciate different monitoring approaches that can be used. At 420, the monitored processor load can be compared to a processing load threshold value. In one or more embodiments, this processing load threshold can be selected based on different considerations, including hardware and network configurations. A non-limiting example threshold value is 80% of processing resources in use.

At 425, in one or more embodiments, when the route update processing load exceeds the processing load threshold, an acceptance threshold can be selected for the acceptance of route updates 390A by router 330D, from router 330A. In one or more embodiments, when the route update processor is overloaded, the quality measures for information, as described above can be used to shed route updates with lower quality information as they are received by router 330D. In this example, the generated threshold for acceptance can be applied to the TTL of route update 390A, as a measure of the quality of the route information of route update 390A. Thus, in an example where a route update has a negative TTL (e.g., the TTL has expired, but the route update is evaluated based on age), when route updating processor 140 has a processing load below the example 80% threshold discussed above, even though the TTL is negative, the TTL is not assessed by the route update evaluating component 126 before acceptance, e.g., no acceptance threshold is applied. In the opposite circumstance, where the processing load of route updating processor 140 exceeds 80%, a TTL threshold can be applied (e.g., 50 μsec) to reduce the processing load, e.g., by shedding route updates such as example route update 390A with a negative TTL.

In one or more embodiments, to facilitate the collection of route information for local use by routers 330A-E, as well as propagation to adjacent routers, routers 330A-E can employ different approaches. One approach that can be employed is the use of network operations that can test the reachability of the routers adjacent to a router, e.g., a ping command to test for the round trip time (RTT) to an adjacent router. For example, returning to the example above, router 330A can ping router 330B and note the RTT of the ping. In a variation of this approach that can test link 380B over a longer time period, one or more embodiments can perform as many consecutive pings as possible over time period, e.g., one second, with the results being the number of round trips per second (RTPS). As discussed below, an RTPS value for link 380D (e.g., determined by pinging router 330C for a second) can be used in an example equation to predict the utility of the route update 390B upon receipt by router 330C, e.g., based on the passage of time during the transmission via link 380D.

One or more embodiments can send pings to adjacent routers of network 300. A timestamp and a Universally Unique Identifier (UUID) can be used by some implementations to uniquely identify the adjacent router for which the ping response was received. In one or more embodiments, during analysis of the packet data, UUIDs can be used to organize information for analysis, e.g., in routing table 175. A response to a ping can be received from an adjacent router and, in one or more embodiments, the ping information can be analyzed to determine route information for the link upon which the ping traveled. For example, in one or more embodiments, information can be determined that include the propagation delay for transmission of packets over the link.

In addition, the response to the ping can include other information, estimated by the pinged router, e.g., relevant processing delays on the pinged router, as well as queue delays for the data queue and control queue. In an example, an estimate of control queue delays (e.g., 5 ms) can be useful to increase the accuracy of the link propagation delay, e.g., because the ping can be delayed because it is store in the control queue.

Continuing the example above, one or more embodiments can receive a response to the ping from the adjacent router of network 300, and different estimates can be identified that can provide information about not only the transmission delay of the pinged link, but also how long data takes to pass through the pinged router, e.g., data queue delays, control queue delays, and route selection delays. These estimates can be included with a ping response sent back to the pinging router on the link from which it was received.

In one or more implementations, route updating processes can run continually, and at a high rate of performance. Because of this, routing information and predictive information can be updated very frequently. When values are not updated, in one or more embodiments, routing devices can be configured to retain the information for a short period of time, e.g., 10 μsec is a non-limiting example time for retaining information at path routers 330A-E. Returning to the RTPS example discussed above, one having skill in the relevant art(s), given the description herein, would appreciate that this RTPS value can incorporate and provide information about a variety of routing conditions, including, but not limited to, downstream and upstream link transit speed, and queueing delays. In one or more embodiments, the RTPS of a link from which a route update is received can be a measure of the importance of the route update. For example, an RTPS can include aspects of the age of the information (e.g., on a fast link, the information is fresher), and the usefulness of the information, e.g., information regarding fast links can be useful routing data.

Generally speaking, authority information can include a combination of a significance of the information received in a route update (e.g., a low or high delay value or other relevant network 300 characteristic) with the age of the information, e.g., remaining TTL from Max TTL.

In a non-limiting example this general approach, information significance can be the RTPS (described with FIG. 4 above) between source router 330D and a path router (e.g., path router 330B), during a period of time. In this example, the more round-trips that can be taken in a period of time, the higher the information significance and the faster the information is received by source router 330D. Thus, this implementation can enable a measure delay to serve two purposes, e.g., as a determinant of the quality of information (the age of the information), and as an indication of the propagation time of a packet. Thus, in this example, lower delay can be indicative of both better information about the route and better conditions on the route. One having skill in the relevant art(s), given the disclosure herein, will appreciate that other approaches can be used to evaluate the value of route updates, without departing from the spirit of one or more embodiments described herein.

As noted throughout this disclosure, to reduce overhead on links, in one or more embodiments, route updates are only forwarded when they are predicted to be valuable to the destination path router. In one or more embodiments, resulting authority can be determined for each update using upstream link delay sent with the route update. In one or more embodiments, a route update is sent only if the determined resulting authority is higher than the routing information received already on that link.

FIG. 5 describes a process for gathering, by a routing device, information about different routing characteristics of network links and path routers that can facilitate the routing of packets to a destination router, in accordance with one or more embodiments. At 530, route update receiving component 125 can receive route updates 390A-B from routers 330B-C respectively. When a threshold value has been determined to have been generated for use 540, at 550, a value (e.g., a measure of the quality of information) can be identified for both route update 390A-B. As noted above, because a value for remaining TTL can already be determined and available from the route updates, one or more embodiments can identify this value for use. Alternatively, one or more embodiments can use different, potentially more complex, measures of quality, e.g., the authority value described with FIG. 5 above. One having skill in the relevant art(s), given the disclosure herein, will appreciate the different implementation approaches that can be used, given different network and hardware implementations. At 555 and 560, the threshold generated with FIG. 4 above can be applied to the identified quality value of route updates 390A-B and, if the threshold is exceeded, at 570, the update is processed, and at 580, the route update is discarded.

Figure 6:
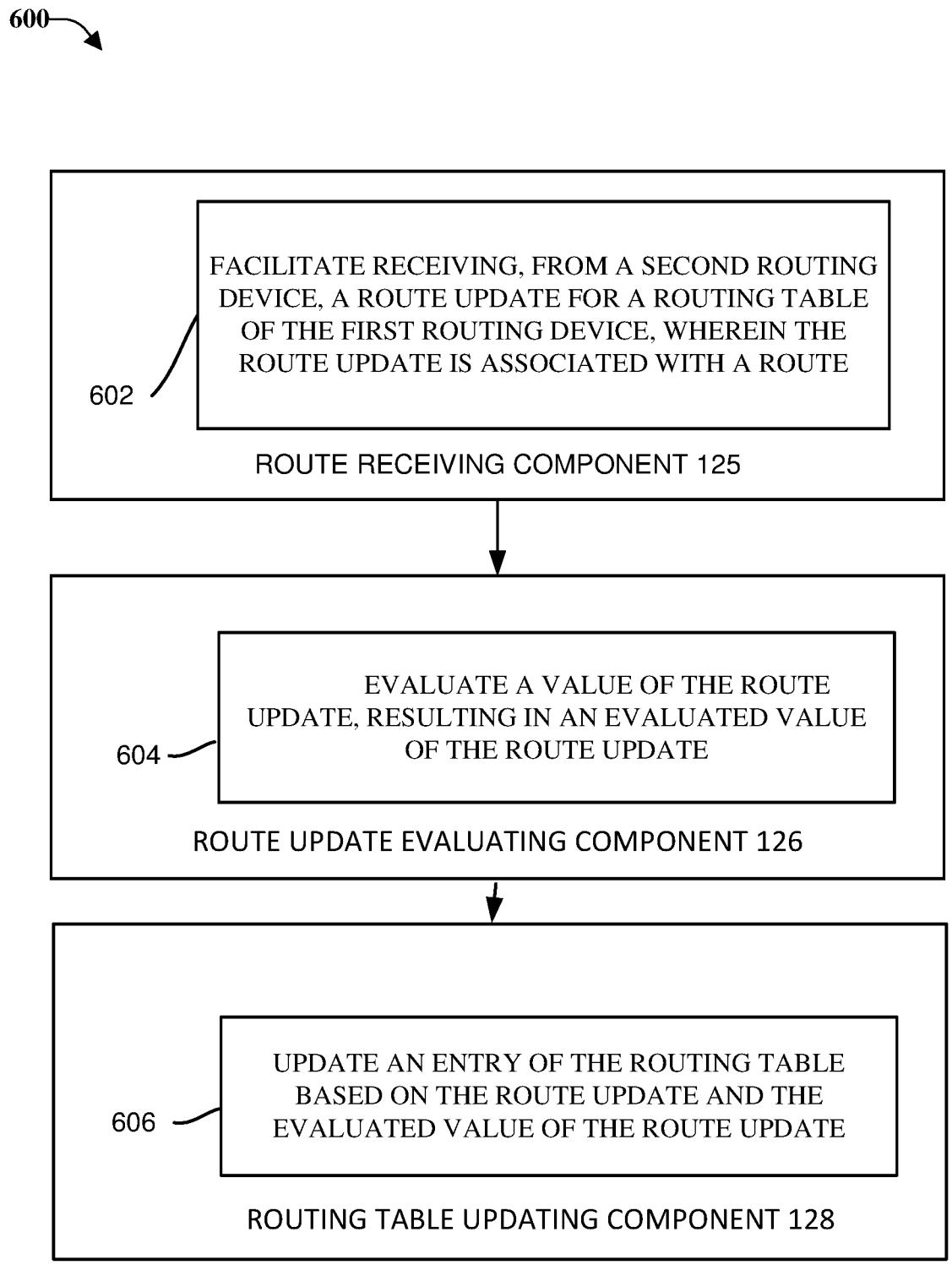
FIG. 6 is a flow diagram representing example operations of an example system 700 comprising a route receiving component, a route update evaluating component, and routing table updating component, that can facilitate shedding processing loads associated with route updates, in accordance with one or more embodiments.

FIG. 6 is a flow diagram representing example operations of an example system 600 comprising a route update receiving component 125, route update evaluating component 126, and routing table updating component 128, that can facilitate shedding processing loads associated with route updates, in accordance with one or more embodiments.

Route update receiving component 125 can be configured 602 to facilitate receiving, from a second routing device, a route update for a routing table of the first routing device, wherein the route update is associated with a route. For example, in one or more embodiments, route update receiving component 125 can be configured 602 to facilitate receiving a route update 182 for a routing table 175 of the first device 150 communicated by a second device 180, wherein the route update is associated with a route.

Route update evaluating component 126 can be configured 604 to evaluate a value of the route update, resulting in an evaluated value of the route update. For example, in one or more embodiments, route update evaluating component 126 can be configured 604 to evaluate a value (e.g., remaining TTL) of the route update 182, resulting in an evaluated value of the route update.

Routing table updating component 128 can be configured 606 to update an entry of the routing table based on the route update and the evaluated value of the route update. For example, in one or more embodiments, routing table updating component 128 can be configured 606 to update an entry (e.g., for router 330A) of the routing table 175 based on the route update 182 and the evaluated value of the route update.

Figure 7:
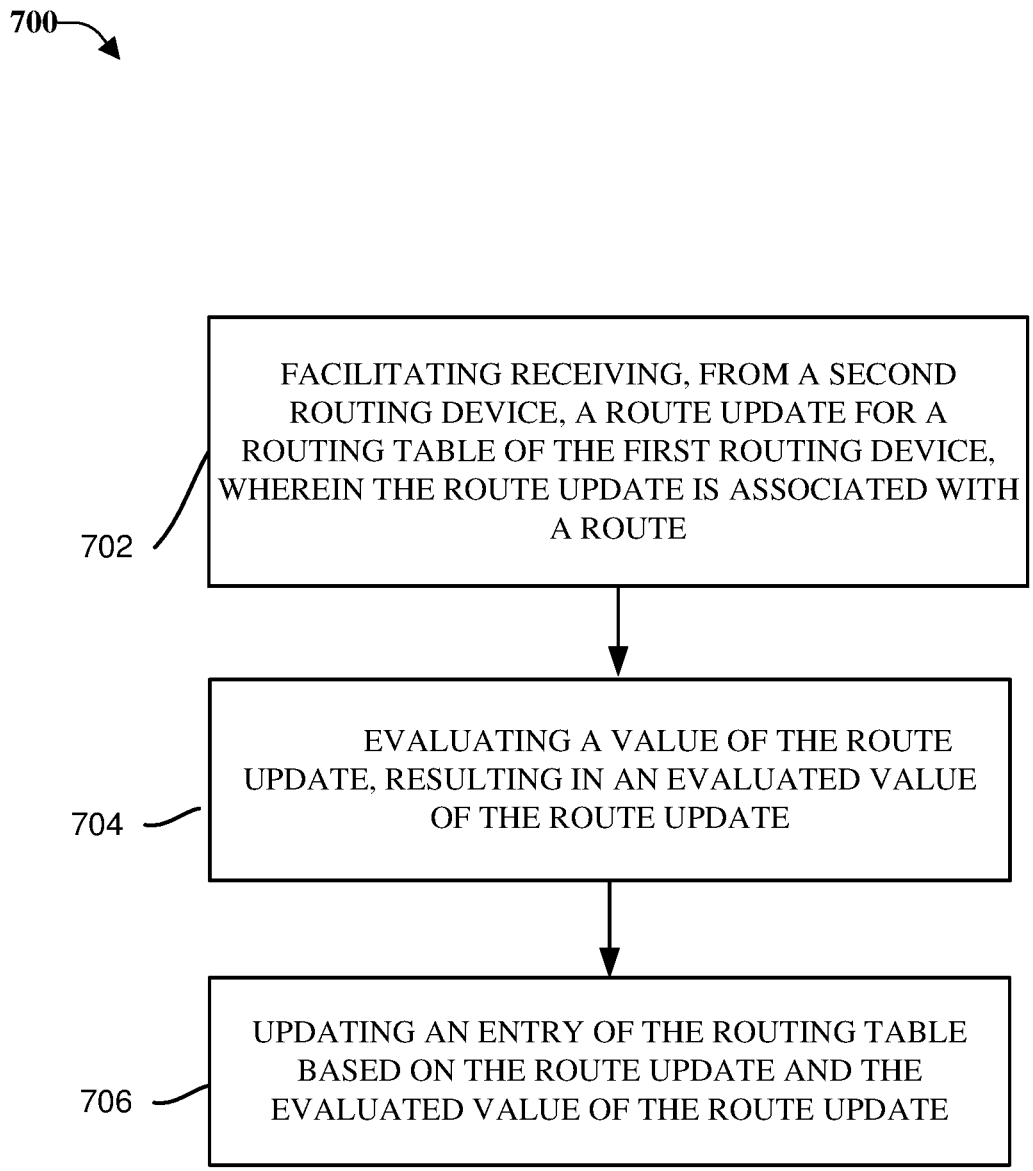
FIG. 7 illustrates a flow diagram of an example method that can facilitate shedding processing loads associated with route updates, in accordance with one or more embodiments.

FIG. 7 illustrates a flow diagram of an example method 700 that can facilitate shedding processing loads associated with route updates, in accordance with one or more embodiments. For purposes of brevity, description of like elements and/or processes employed in other embodiments is omitted.

At 702, method 700 can comprise facilitating receiving, from a second routing device, a route update for a routing table of the first routing device, wherein the route update is associated with a route. For example, in one or more embodiments, method 700 can comprise facilitating receiving a route update 182 for a routing table 175 of the first device 150 communicated by a second device 180, wherein the route update is associated with a route. At 704, method 700 can comprise evaluating a value of the route update, resulting in an evaluated value of the route update. For example, in one or more embodiments, method 700 can comprise evaluating a value (e.g., remaining TTL) of the route update 172, resulting in an evaluated value of the route update.

At 706, method 700 can comprise updating an entry of the routing table based on the route update and the evaluated value of the route update. For example, in one or more embodiments, method 700 can comprise updating an entry (e.g., for router 330A) of the routing table 175 based on the route update 182 and the evaluated value of the route update.

Figure 8:
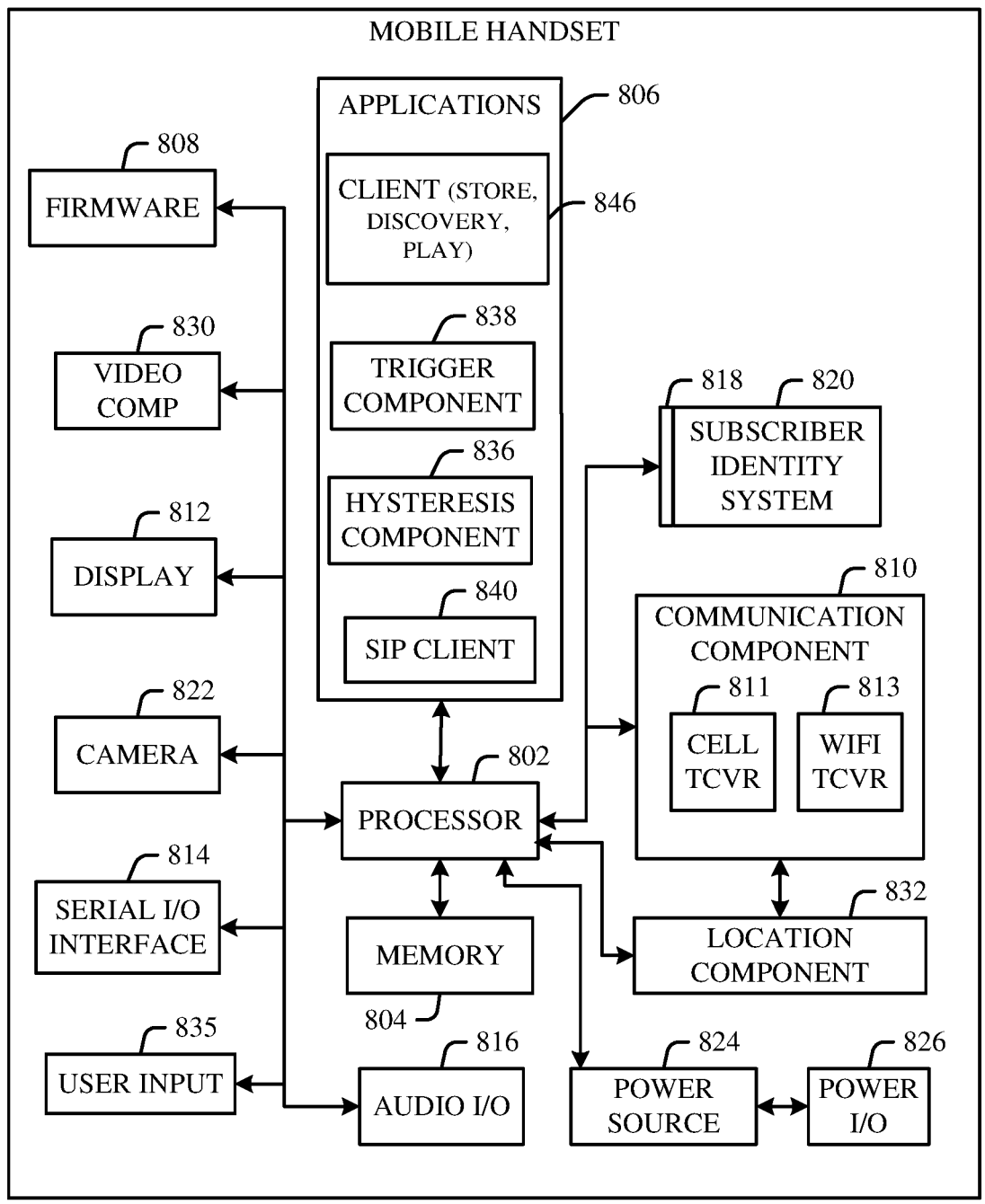
FIG. 8 illustrates an example block diagram of an example load shedding system to engage in a system architecture that can facilitate processes described herein, in accordance with one or more embodiments.

FIG. 8 illustrates an example block diagram of a mobile handset 800 operable to engage in a system architecture that facilitates wireless communications according to one or more embodiments described herein. For purposes of brevity, description of like elements and/or processes employed in other embodiments is omitted. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the handset 800. A communications component 810 interfaces to the processor 802 to facilitate wired/wireless communication with external systems, e.g., cellular networks, VoIP networks, and so on. Here, the communications component 810 can also include a suitable cellular transceiver 811 (e.g., a GSM transceiver) and/or an unlicensed transceiver 813 (e.g., Wi-Fi, WiMax) for corresponding signal communications. The handset 800 can be a device such as a cellular telephone, a PDA with mobile communications capabilities, and messaging-centric devices. The communications component 810 also facilitates communications reception from terrestrial radio networks (e.g., broadcast), digital satellite radio networks, and Internet-based radio services networks.

The handset 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1294) through a hardwire connection, and other serial input devices (e.g., a keyboard, keypad, and mouse). This supports updating and troubleshooting the handset 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The handset 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the handset 800, and updated by downloading data and software.

The handset 800 can process IP data traffic through the communications component 810 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The handset 800 also includes a power source 824 in the form of batteries and/or an AC power subsystem, which power source 824 can interface to an external power system or charging equipment (not shown) by a power I/O component 826.

The handset 800 can also include a video component 830 for processing video content received and, for recording and transmitting video content. For example, the video component 830 can facilitate the generation, editing and sharing of video quotes. A location tracking component 832 facilitates geographically locating the handset 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the handset 800 to support SIP protocols and register the subscriber with the SIP registrar server. The applications 806 can also include a client 842 that provides at least the capability of discovery, play and store of multimedia content, for example, music.

The handset 800, as indicated above related to the communications component 810, includes an indoor network radio transceiver 813 (e.g., Wi-Fi transceiver). This function supports the indoor radio link, such as IEEE 802.11, for the dual-mode GSM handset 800. The handset 800 can accommodate at least satellite radio services through a handset that can combine wireless voice and digital radio chipsets into a single handheld device.

One or more devices described herein can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

One or more embodiments can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 9:
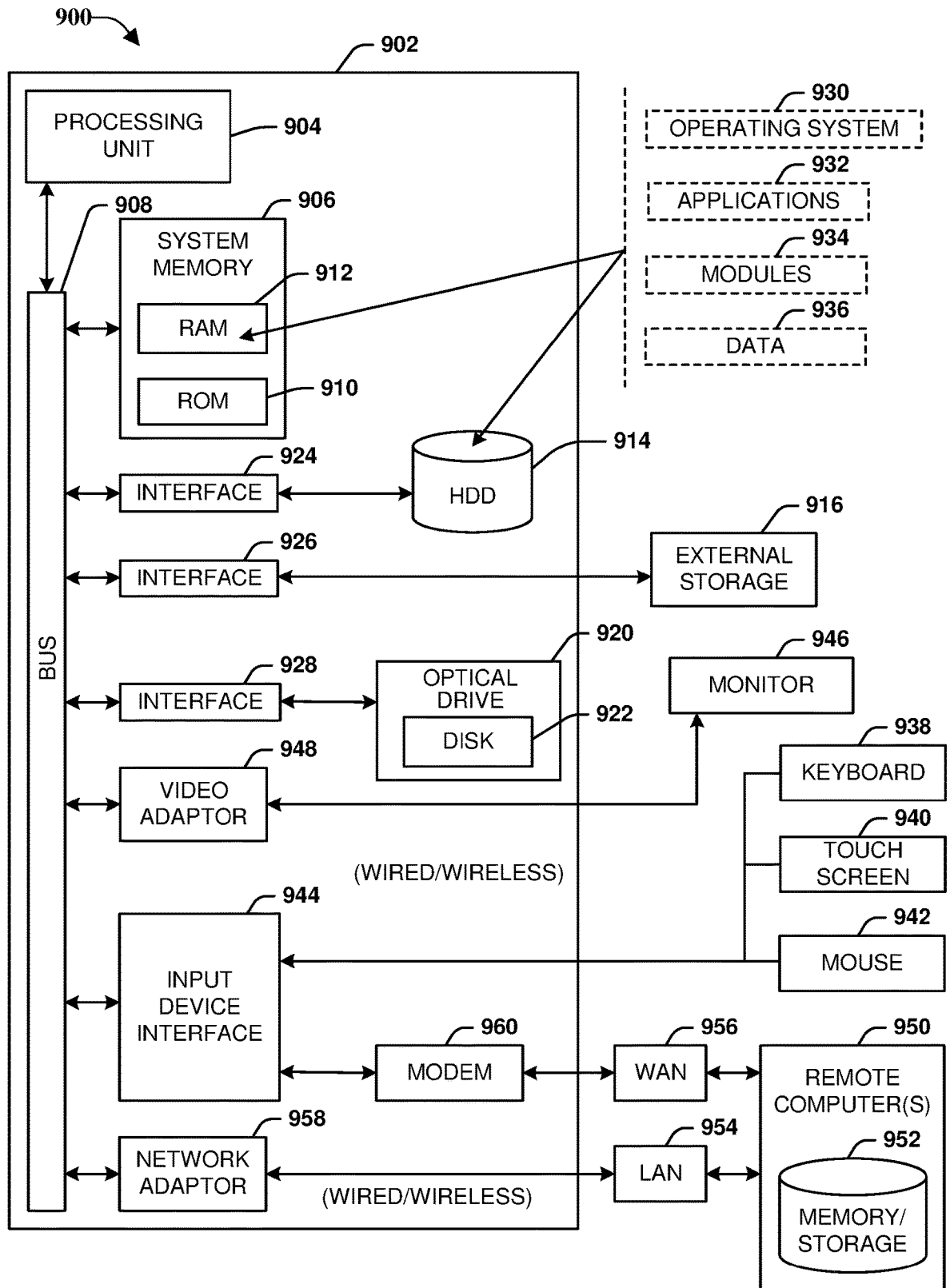
FIG. 9 illustrates an example block diagram of an example computer operable to engage in a system architecture that can facilitate processes described herein, in accordance with one or more embodiments.

Referring now to FIG. 9, in order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A first routing device, comprising:
    a processor; and
    a memory that stores executable instructions that, when executed by the processor, cause performance of operations, comprising:
        receiving, from a second routing device, a route update for a routing table of the first routing device, wherein the route update is associated with a route;
        evaluating a value of the route update, resulting in an evaluated value of the route update, wherein evaluating the value of the route update is based on usefulness data representative of a usefulness of the route update for routing network traffic; and
        based on the evaluated value of the route update being determined to be in a condition in relation to a first threshold value, updating an entry of the routing table based on the route update and the evaluated value of the route update, wherein the usefulness data of the route update is based on a duration, described by the route update, of a delay for the route in relation to the first threshold value.

2. The first routing device of claim 1, wherein the usefulness data is further based on age data representative of an age of the route update in relation to the first threshold value.

3. The first routing device of claim 1, wherein the usefulness data of the route update is further based on an expiration time for the route update.

4. The first routing device of claim 1, wherein evaluating the value of the route update comprises evaluating the value of the route update relative to a route update processing load of the first routing device.

5. The first routing device of claim 1, wherein receiving the route update from the second routing device comprises receiving the route update asynchronously, and based on an occurrence of an event for the route detected by the second routing device.

6. The second routing device of claim 5, wherein the event comprises a change in a link delay interval for the route.

7. The first routing device of claim 1, wherein the operations further comprise:

receiving the value of the route update from the second routing device that determined the value of the route update based on analysis of the route and the route update.

8. A method, comprising:

identifying, by a first router device comprising a processor, a route update for a route to a destination router on a network;

evaluating, by the first router device, a value of the route update for the route, resulting in an evaluated value of the route update, wherein evaluating the value of the route update is based on usefulness data representative of a usefulness of the route update for routing network traffic, wherein the usefulness data is based on a duration, described by the route update, of a delay for the route in relation to a first threshold value; and facilitating, by the first router device, transmitting, to a second router device, the route update for updating an entry of a routing table of the second router device based on the route update and the evaluated value of the route update, the transmitting resulting in a transmitted route update, wherein the second router device updated an entry of a routing table based on the evaluated value of the route update being determined to be in a condition in relation to the first threshold value.

9. The method of claim 8, wherein the second router device updated the entry further based on an increment of time, determined by the second router device, between the identifying the route update by the first router device and receipt of the route update by the second router device.

10. The method of claim 8, wherein identifying the route update for the route comprises receiving the route update from a third router device.

11. The method of claim 8, wherein the second router device accepts the transmitted route update based on a route processing load of a route processor of the second router device being in a condition in relation to a second threshold value.

12. The method of claim 8, further comprising:

receiving, by the first router device, from the second router device, an indication that the route update has not been accepted by the second router device.

13. The method of claim 8, wherein the evaluated value of the route update was received from the second router device based on a route processing load of a route processor of the second router device.

14. A non-transitory machine-readable medium comprising executable instructions that, when executed by a processor of a first routing device, result in performance of operations, the operations comprising:

receiving a route update for a routing table of the first routing device communicated by a second routing device, wherein the route update is associated with a route;

evaluating a value of the route update, resulting in an evaluated value of the route update, wherein evaluating the value of the route update is based on a duration, described by the route update, of a delay for the route in relation to a first threshold value; and based on the evaluated value of the route update being determined to be in a condition in relation to the first threshold value, updating an entry of the routing table based on the route update and the evaluated value of the route update.

15. The non-transitory machine-readable medium of claim 14, wherein evaluating the value of the route update is triggered by a route update processing load of the first routing device exceeding a second threshold value.

16. The non-transitory machine-readable medium of claim 14, wherein the operations further comprise, enabling an application of the first threshold value to the value of the route update based on the value of the route update.

17. The non-transitory machine-readable medium of claim 14, wherein the route update received from the second routing device was communicated by the second routing device based on analysis of the route and the route update by the second routing device.

18. The non-transitory machine-readable medium of claim 14, wherein the route update received from the second routing device was communicated by the second routing device based on a route update processing load of the second routing device.

19. The non-transitory machine-readable medium of claim 14, wherein the duration of a delay for the route in relation to the first threshold value comprises usefulness data representative of a usefulness of the route update for routing network traffic according to a defined usefulness criterion.

20. The non-transitory machine-readable medium of claim 14, wherein the operations further comprise, receiving the value of the route update from the second routing device.

* * * * *